US012748927B2

(12) United States Patent
Tow

(10) Patent No.: US 12,748,927 B2
(45) Date of Patent: Sep. 29, 2026

(54) LARGE LANGUAGE MODEL AGGREGATOR

(71) Applicant: Oracle International Corporation, Redwood Shores, CA (US)

(72) Inventor: Daniel S. Tow, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 321 days.

(21) Appl. No.: 18/410,125

(22) Filed: Jan. 11, 2024

(65) Prior Publication Data

US 2025/0232123 A1 Jul. 17, 2025

(51) Int. Cl.
*G06F 3/0482* (2013.01)
*G06F 40/35* (2020.01)

(52) U.S. Cl.
CPC ............ *G06F 40/35* (2020.01); *G06F 3/0482* (2013.01)

(58) Field of Classification Search
CPC ............................... G06F 40/35; G06F 3/0482
See application file for complete search history.

(56) References Cited

U.S. PATENT DOCUMENTS 10,896,230 B2 1/2021 English et al.
12,395,583 B2 * 8/2025 Salvana ............ H04M 1/72412
2013/0073323 A1 * 3/2013 Zacharia .............. G06Q 10/025 705/5
2019/0258685 A1 * 8/2019 English ................. G06F 16/954
2023/0334592 A1 * 10/2023 Johari .................. G06Q 40/123
2024/0330863 A1 * 10/2024 Hajarnis ............ G06Q 10/1053
2024/0362497 A1 * 10/2024 Grenader ............. G06N 3/0455
2024/0412000 A1 * 12/2024 Mui ....................... G06F 16/953
2025/0005276 A1 * 1/2025 Bhat ........................ G06F 40/30
2025/0045531 A1 * 2/2025 Hayes ...................... G06F 40/56
2025/0131024 A1 * 4/2025 Gupta ................... H04L 67/535
2025/0156453 A1 * 5/2025 Conway ................ G06F 16/338
2025/0190462 A1 * 6/2025 Madisetti .............. G06F 40/284
2025/0238443 A1 * 7/2025 Krishnan .............. G06F 16/243

* cited by examiner

*Primary Examiner* — Anil K Bhargava
(74) *Attorney, Agent, or Firm* — Kilpatrick Townsend & Stockton LLP

(57) ABSTRACT

Generative artificial intelligence-based techniques are disclosed herein to conduct conversations of various types with multiple Large Language Model Services at once. In one aspect, a method is provided that includes identifying large language model services that qualify to take part in the conversation based, at least in part, on a conversation type and profile information provided by a user, user-selected terms selected by the user specific to the conversation, or both, rendering a conversation screen in a graphical user interface, receiving a prompt input into a dialog box of the conversation screen, communicating the prompt input to each of the large language model services, receiving responses from the large language model services based on the prompt input, and rendering the responses in a dialog box of the conversation screen with an indication of which of the large language model services provided each of the responses.

20 Claims, 12 Drawing Sheets

LARGE LANGUAGE MODEL AGGREGATOR

FIELD

The present disclosure relates to generative artificial intelligence-based techniques. More particularly, the disclosure relates to generative artificial intelligence-based techniques to conduct conversations of various types with multiple Large Language Model Services (LLMSs) at once, for example, multiple chatbots, and/or multiple image-generators.

BACKGROUND

Generative artificial intelligence is a broad concept encompassing various forms of content generation, while Large Language Models (LLMs) are a specific application of generative artificial intelligence. Large language model services are generative artificial intelligence platforms that utilize expansive datasets and complex algorithms within LLMs to understand, generate, and manipulate human language. The LLMs deployed on these platforms serve as foundation models providing a basis for a wide range of natural language processing tasks including language generation and summarization, chatbots, code generation, translation, document and data analysis, data mining, and more. Additionally, LLMs can be combined with other generative artificial intelligence models that work with other modalities, such as images or audio to provide multimodal generative artificial intelligence systems. This enables the creation of multimodal content, where the generative artificial intelligence systems within these extensive language model services can generate text descriptions for images, produce distinct images or videos, or even compose soundtracks for videos.

Most LLMs, such as a Generative Pre-trained Transformer (GPT), use transformer architectures that allow the models to process and generate text by paying attention to different parts of the input text, capturing context, and relationships effectively. The LLMs learn contextual representations of words or phrases and analyze patterns in the text to learn the rules and nuances of language. This means the models understand words based on their context in sentences or documents rather than just their isolated meanings. After pre-training on vast text corpora, the LLMs can be fine-tuned for specific tasks such as language translation, summarization, question answering, or text generation, or further trained as specialized models that combine language understanding with image understanding (e.g., computer vision models). These specialized models learn associations between text and corresponding images during training enabling them to generate images based on textual descriptions or prompts, or to generate textual descriptions from image or video prompts. Once deployed, the LLMs and specialized models generate text or images based on prompts or cues given to them (e.g., utterances and/or images) by a user. The LLMs and specialized models use the learned rules and nuances of language to predict the most likely next words, phrases, or objects, creating coherent and contextually relevant text and/or images.

BRIEF SUMMARY

In various embodiments, a computer-implemented method is provided that includes: accessing, by a computing system, profile information provided by a user, terms selected by the user that are particular for a conversation, or both; determining, by the computing system, a conversation type for the conversation; identifying one or more large language model services that qualify to take part in the conversation based, at least in part, on the conversation type and the profile information provided by the user, the user-selected terms selected by the user specific to the conversation, or both; rendering, by the computing system, a conversation screen within a graphical user interface, wherein the conversation screen comprises: (i) a representation of the one or more large language model services, and (ii) one or more dialog boxes; receiving, by the computing system, a prompt input into a dialog box of the one or more dialog boxes; communicating, by the computing system, the prompt input to each of the one or more large language model services; receiving, by the computing system, one or more responses from the one or more large language model services based on the prompt input; and rendering, by the computing system, the one or more responses in a dialog box of the one or more dialog boxes with an indication of which of the one or more large language model services provided each of the one or more responses.

In some embodiments, communicating the prompt input comprises communicating at least some of the profile information with the prompt input to the one or more large language model services, and wherein the responses from the one or more large language model services are received based on the prompt input and at least some of the profile information.

In some embodiments, the computer-implemented method further comprises rendering, by the computing system, a menu in the graphical user interface, wherein the menu comprises conversation types for selection by the user for the conversation, wherein the conversation types include image-generation and text-based conversation, and the conversation type for the conversation is received from the user interacting with the conversation types in the menu.

In some embodiments, the identifying the one or more large language models comprises: identifying a subset of large language model services that have one or more generative machine learning models trained to handle the conversation type; and identifying the one or more large language model services from the subset of large language model services that qualify to take part in the conversation and are available to take part in the conversation based, at least in part, on the conversation type and the profile information provided by the user, the user-selected terms selected by the user specific to the conversation, or both.

In some embodiments, the computer-implemented method further comprises ranking the one or more responses from the one or more large language model services based on: (i) an estimation of probable preferences for the user, (ii) overall ratings of the one or more large language model services, (iii) ratings applicable to the profile information provided by the user, (iv) past ratings by the user of prior responses from the one or more large language model services, or (v) any combination thereof, wherein the responses are rendered in the one or more dialog boxes based on the ranking.

In some embodiments, the computer-implemented method further comprises: receiving, by the computing system, a subsequent prompt input into the one or more dialog boxes by the user; communicating, by the computing system, the subsequent prompt input and the one or more responses to the prompt input to the one or more large language model services; receiving, by the computing system, one or more subsequent responses from the one or more large language model services based on the one or more subsequent prompt inputs and the one or more responses to the prompt input; and rendering, by the computing system, the one or more subsequent responses in the one or more dialog boxes with an indication of which of the one or more large language model services provided each of the one or more subsequent responses.

In some embodiments, the computer-implemented method further comprises communicating, by the computing system, one or more responses from each of one or more large language model service of at least a subset of the one or more large language model services to other large language model services within the subset of the large language model services, wherein the subset of large language model services have an agreement to share responses between member large language model services of the subset of the large language model services.

In various embodiments, a system is provided that includes one or more processors and one or more computer-readable media storing instructions which, when executed by the one or more processors, cause the system to perform part or all of one or more methods disclosed herein.

In various embodiments, one or more non-transitory computer-readable media are provided for storing instructions which, when executed by one or more processors, cause a system to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

The present invention will be better understood in view of the following non-limiting figures, in which.

Figure 1:
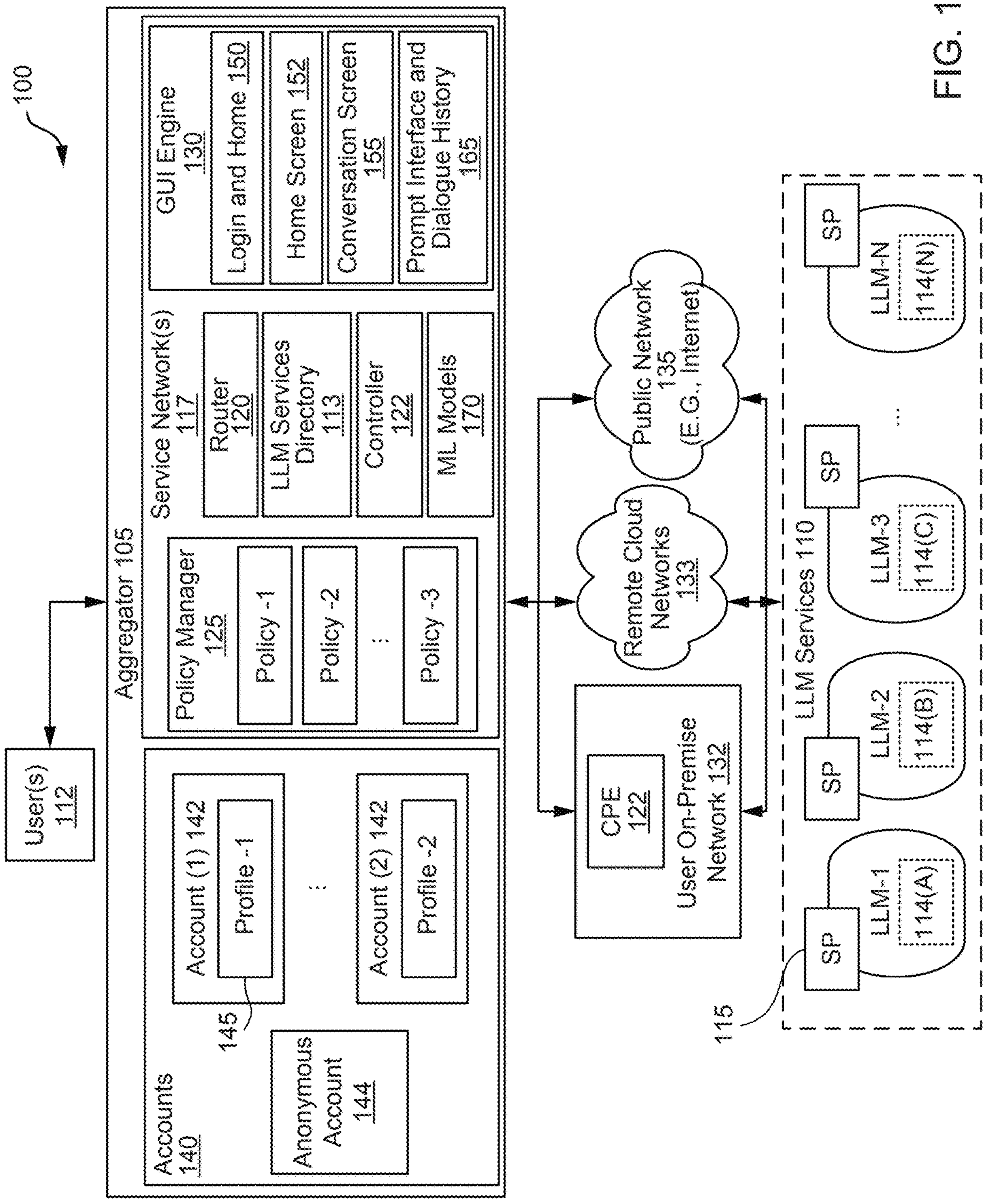
FIG. 1 is a high-level diagram of a distributed environment showing an aggregator network according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

There is a growing number of publicly accessible LLM services (LLMSs), such as chatbots and image generators. It would be beneficial to access subsets of these services in aggregate, without needing to reach them separately. Users want to conveniently see results from multiple LLMSs such as chatbots and/or image generators from a single application, even sometimes to engage those multiple LLMSs to converse with each other to discuss or debate topics of interest to the user, for example. In order to address these challenges and others, the present disclosure is directed to artificial intelligence-based techniques to conduct conversations of various types with multiple LLMSs at once via aggregation. Aggregation enables a clear benefit to the users, who can find the best response among several LLMs responding to a given prompt, but it also offers potential benefits to cooperating LLMs, bringing them extra traffic and better data for Machine Learning (ML). The embodiments described herein entail creating a Large-Language-Model Aggregator (LLMA), for the convenience of users who wish to engage in conversations involving multiple LLMSs at once, and to provide certain advantages to LLMSs that work in tandem with the LLMA.

In various embodiments, a computer-implemented method is provided that includes: accessing, by a computing system (e.g., a LLMA), profile information provided by a user, terms selected by the user that are particular for a conversation, or both; determining, by the computing system, a conversation type for the conversation; identifying one or more large language model services that qualify to take part in the conversation based, at least in part, on the conversation type and the profile information provided by the user, the user-selected terms selected by the user specific to the conversation, or both; rendering, by the computing system, a conversation screen within a graphical user interface, wherein the conversation screen comprises: (i) a representation of the one or more large language model services, and (ii) one or more dialog boxes; receiving, by the computing system, a prompt input into a dialog box of the one or more dialog boxes; communicating, by the computing system, the prompt input to each of the one or more large language model services; receiving, by the computing system, one or more responses from the one or more large language model services based on the prompt input; and rendering, by the computing system, the one or more responses in a dialog box of the one or more dialog boxes with an indication of which of the one or more large language model services provided each of the one or more responses.

Advantageously, the LLMA handles multiple LLM conversations that would be impractical without the LLMA, transparently to the user. Moreover, users are enabled to have more diverse and complex LLM-driven conversations than they can have with a single LLMS. The alternative, for a user, would be to have multiple separate windows running separate chatbot or image-generation conversations, and to cut-and-paste prompts and responses from window to window, at major inconvenience.

Although a primary goal of the LLMA is to handle and aggregate multiple LLM conversations, it should be understood that it is contemplated that in certain instances only a single LLMS will be available or agree to have a conversation with the user, and the LLMA should be understood to be configured to facilitate this conversation in a similar manner as disclosed herein for multiple conversations. Consequently, the use of the term "one or more large language models" is used herein to cover this instance of only a single LLMS being available or agreeing to have a conversation with the user. However, in many instances, it should be further understood that multiple LLMS will be available or agree to have a conversation with the user and thus the one or more large language models can be multiple large language models, e.g., two or more large language models, three or more large language models, etc.

As used herein, when an action is "based on" something, this means the action is based at least in part on at least a part of the something. As used herein, the terms "similarly," "substantially," "approximately" and "about" are defined as being largely but not necessarily wholly what is specified (and include wholly what is specified) as understood by one of ordinary skill in the art. In any disclosed embodiment, the term "similarly," "substantially," "approximately," or "about" may be substituted with "within [a percentage] of" what is specified, where the percentage includes 0.1, 1, 5, and 10 percent.

LLM Aggregator Architecture

FIG. 1 is a high-level diagram of a distributed environment 100 showing an aggregator network to enable users to engage in conversations involving multiple LLMSs at once, and to provide certain advantages to LLMSs that work in tandem with a LLMA according to various embodiments. The distributed environment 100 depicted in FIG. 1 includes multiple components and systems arranged within the aggregator network. However, the distributed environment 100 depicted in FIG. 1 is merely an example and is not intended to unduly limit the scope of claimed embodiments. Many variations, alternatives, and modifications are possible. For example, in some implementations, the distributed environment 100 depicted in FIG. 1 may have more or fewer systems or components than those shown in FIG. 1, may combine two or more systems, or may have a different configuration or arrangement of systems.

As shown in the example depicted in FIG. 1, the distributed environment 100 comprises LLMA 105 in communication with various LLMSs 110 that provides services and resources that users 112 can subscribe to and engage with for various tasks including language generation and summarization, chatbots, code generation, image and video generation, translation, document and data analysis, data mining, music composition, audio generation, and more. LLMA 105 is a service and application that enables users 112 to conduct conversations with multiple LLMSs 110 at once, optionally including multiple human users in the same conversation, as well. The provider of the LLMA 105 would pre-negotiate agreements and interfaces with the various partnering LLMSs, together with which terms the LLMSs accept for inclusion in LLMA conversations. For example, an LLMS might or might not accept anonymous logins from users, might or might not accept conversations it is required to erase from its records at the end-of-conversation, and it might or might not accept multi-way or other conversations requiring sharing of its responses with any or certain other LLMSs. The partnering LLMSs and terms the LLMSs accept for inclusion in LLMA conversations can be stored and maintained in LLM Services Directory 113 (e.g., data storage or database). 20. The LLMA 105 handles, based on the negotiated terms, any given conversation between users and LLMSs 110 (i.e., conversations typically only include LLMSs agreeing to and meeting the terms the user requires for that specified conversation). The LLMA further handles arranging, as required, terms acceptable to the LLMSs 110 to enable LLMS revenue, if any, whether that be by billing the user per-use and passing on the LLMS's shares, passing on subscription funds, or sharing LLMS-provided ads in the LLMA user interfaces.

The users 112 of the LLMA 105 providing prompts and consuming conversations, presumably are in general humans but it is considered a possibility in the future that the users 112 could be other artificial intelligence systems such as virtual assistants seeking content generation from LLMSs 110. The LLMSs 110 provide one or more generative systems or models 114, e.g., one or more LLMs, configured by a specific LLM provider 115 to provide a specific LLM-driven service, such as a specific Chatbot or Image Generator. The conversations are a sequence of prompts and responses between at least one human user and at least one LLMS, such that the LLMS can see at a minimum the user's prior prompt(s) and the LLMS's prior response(s) for context. The prompts are natural language utterances (e.g., text or audio) provided by a user instructing the LLMSs 110 what the user wants for a next response (e.g., please provide me an explanation of how snow is created). The response is the LLMS's answer to the prior prompt, with context from prior prompt-response pairs in the same conversation, if any. In the instance of multi-way conversations, the response may use multiple prior prompts, including prompts constructed from other LLMS's prior responses, as described in further detail herein.

In various embodiments, LLMA 105 offers the aggregation of LLM-driven services as part of an infrastructure as a service (IaaS) to subscribing users using one or more cloud computing architectures describe herein in more detail with respect to FIGS. 7-11. In the embodiment depicted in FIG. 1, LLMA 105 comprises one or more service networks 117 (e.g., as Virtual Cloud Networks (VCN). Although only one service network 117 is depicted within FIG. 1, it should be understood that multiple service networks could be instantiated within the LLMA 105. A router 120, for example a VCN Virtual Router, represents a logical gateway for the service network 117 that enables communications between components of the service network 117, and with other endpoints (e.g., LLMSs 110) outside the service network 117. The router 120 is configured to route traffic between components (e.g., controller 122 (such as a virtual network interface (VNIC)) that can execute one or more compute instances) in the service network 117 and gateways associated with the service network 117. The router 120 can provide a port for each component of the service network 117. For example, the router 120 may provide a port with a first IP address for controller 122, a port with a second IP address for policy manager 125, and a port with a third IP address for Graphical User Interface (GUI) Engine 130. Additionally or alternatively, the router 120 can provide a port for each service network 117. For example, router 120 may provide a port with a first IP address for service network 117(A), a port with a second IP address for service network 117(B), and a port with a third IP address for service network 117(C).

Multiple compute instances may be deployed on each service network 117, where the compute instances can be virtual machine instances and/or bare metal instances configured to implement operations described herein for aggregating conversations with multiples LLMSs. The compute instances in a service network 117 may be hosted by one or more host machines within distributed environment 100. A compute instance participates in a service network 117 via a controller 122 associated with the compute instance. For example, a compute instance C1 may be part of service network 117(A) via a controller 122(*a*) associated with C1. Likewise, a compute instance C2 may be part of service network 117(A) via a controller 122(*b*) associated with C2. In a similar manner, multiple compute instances, which may be virtual machine instances or bare metal instances, may be part of service network 117(A). Via its associated controller 122, each compute instance may be assigned a private overlay IP address and a MAC address. For example, compute instance C1 has a first overlay IP address of O1 and a MAC address of M1, while compute instance C2 has a private overlay IP address of O2 and a MAC address of M2. Each compute instance in service network 117(A), including compute instances C1 and C2, may have a default route to router 120 using IP address R1, which may be the IP address for a port of router 120 for service network 117(A).

Service network 117(B) can have multiple compute instances deployed on it, including virtual machine instances and/or bare metal instances. For example, compute instances D1 and D2 may be part of service network 117(B) via controller 122(*d*1); 122(*d*2) associated with the respective compute instances. Compute instance D1 may have a first overlay IP address of OO1 and a MAC address of MM1, while compute instance D2 may have a private overlay IP address of OO2 and a MAC address of MM2. Each compute instance in service network 117(B), including compute instances D1 and D2, may have a default router 120 using IP address R2, which is the IP address for a port of router 120 for service network 117(B).

Each service network 117 may also include one or more load balancers. For example, a load balancer may be provided for a network or subnet and may be configured to load balance traffic across multiple compute instances on the network or subnet. A load balancer may also be provided to load balance traffic across networks or subnets in the LLMA 105.

Each particular compute instance deployed on a service network 117 can communicate with various different endpoints. These endpoints may include endpoints that are hosted by LLMA 105 and endpoints outside LLMA 105. Endpoints that are hosted by LLMA 105 may include: an endpoint on the same network or subnet as the particular compute instance (e.g., communications between two compute instances in service network 117(A)); an endpoint on a different network or subnet but within the same service network 117 (e.g., communication between a compute instance in service network 117(A) and a compute instance in service network 117(B)); an endpoint in a different service network 117 in the same region (e.g., communications between a compute instance in service network 117(A) and an endpoint in a service network 117(C) in the same region, communications between a compute instance in service network 117(A) and an endpoint in service network 117(D) in the same region); or an endpoint in a service network 117 in a different region (e.g., communications between a compute instance in service network 117(A) and an endpoint in a service network 117(B) in a different region). A compute instance in a network or subnet hosted by LLMA 105 may also communicate with endpoints that are not hosted by LLMA 105 (i.e., are outside LLMA 105). These outside endpoints include LLMSs 110 endpoints in the user's on-premise network 132, endpoints within other remote cloud hosted networks 133, public endpoints 135 accessible via a public network such as the Internet, and other endpoints.

The LLMA 105 supports accounts 140, including individual user accounts (UAs) 142, optionally, a shared Anonymous Account (AA) 144 that users 112 may log into without a username and password or other identity verification technique. A UA 142 is a LLMA account belonging to a user that stores and maintains a user profile (UP) 145 and is optionally used to bill that user for LLM aggregation services. The UP 145 is a profile of user-specific data used by the LLMA 105 to customize that user's experience with the aggregation services. The profile is stored information that the LLMA 105 maintains about each UA 142, provided by a user, for use in customizing the LLMA user experience for that UA 142. The anonymous account 144 is an account with a generic profile shared by any user that logs into the LLMA 105 anonymously, if that is allowed. Accounts other than the AA 144 account can require username and password access or other identity verification to confirm that the user 112 is authorized to use the UA 142.

The LLMA 105 supports a UP 145 for each UA 142. The AA UP is generic and not modifiable by users 112, but the individual UPs 145 can be set up and adjusted according to user preferences and characteristics (for example, minor or adult, education level, and the like). For example, the controller 122 and compute instances of a given service network 117 can be used by users 112 to self-describe a UP 145 of their preferences that they wish to share with the LLMA 105 and, optionally, with the LLMSs 110, leveraging a single central profile for each user 112, rather than repeatedly setting up profile information with each LLMS 110. UPs 145 would optionally describe aspects of the user such as preferred language/dialect, interests, favorite LLMSs, and levels of ability in various subjects that might help customize conversations for the user's benefit, to be shared with the LLMSs 110 if the user agrees, and to be used by the LLMA 105 to help select LLMSs 110 and rank them for each particular conversation. Mainly, only UP 145 information that the user agrees to share would be shared with the LLMA 105 and LLMSs 110, though some characteristics, such as minor versus adult status might be mandatory, or fall back to the most-restrictive value if unspecified. UPs 145 may include a number of adjustable parameters, such as whether the user requires that LLMS and LLMA records of conversations of a given type be erased at the close of the conversation, whether conversations of a given type be kept anonymous from the LLMSs in that conversation, the user's target level of preferred-maximum-reading-difficulty, if any, for responses to their prompts, the user's preference order for LLMSs to be presented, the user's preferences for any LLMSs to be excluded from conversations, the User's Linked Usernames (ULUs) for their own LLMS accounts to be linked to the UA, and the like.

A ULU is a username for the user's account directly on a given LLMS to be used from the UA 142 on the LLMA 105. When the UA 142 has a ULU for an LLMS, logging in may include logging into the linked accounts, at the LLMS using that ULU. This would involve an identity-confirmation step, such as the user providing the ULU's username and password, with the first login from the UA 142, but the LLMS could optionally invite the user to trust logins from the LLMA 105 for that ULU, as an option, avoiding future separate per-LLMS identity verification once the user has logged in from the LLMA 105.

The LLMA 105 comprises a GUI Engine 130 for rendering one or more GUIs that support a series of menus or selection buttons available to the user, presented by a home screen (HS) 152 after user login on a login and home page 150 to a new session. In certain embodiments, the HS 152 is the first screen the user sees on logging into the LLMA 105, and after closing any prior conversations or sessions other than by logging out. A session is the whole interaction between users 112, LLMA 105, and LLMSs 110 to support any number of conversations between the user logging into the LLMA 105 and logging out or otherwise dropping the LLMA connection. The HS 152 can be further used to enable setup and changes to the UP 145, or to specify the nature of the conversation the user wants, including means to override, for the duration of the session, or until otherwise overridden, again, the UA's UP-specified preferences.

Prior to opening a conversation for a user, the LLMA 105 may offer users a menu of LLMS Conversation Types (CTs) to choose from, including for example, image-generation and chatbot conversation. A CT is a type class indicating what sort of LLMSs will be involved with a conversation, under what rules, and how they will interact with the user(s) involved, and how they will interact (if at all) with other LLMSs in the same conversation. Generally, users can request a CT having interactions between the user and LLMSs that are executed in a parallel or multi-way manner. In parallel interactions, the LLMSs would respond in parallel only to each of the user's prompts, without taking into account (or even seeing) the other LLMSs' responses. In multi-way conversations LLMSs would not only see the user's prompts, but also the responses of the other LLMSs, where LLMSs have agreed to support such LLMS-to-LLMS conversations. For example, a user might designate two chatbot LLMSs to engage in a three-way discussion that begins with the user, with the LLMSs taking turns in their own responses. The user might designate one LLMS to take the "pro" side of a debate, and the other to take the "con" side or could simply ask that they discuss with each other the topic, in turn. In such cases, the user might just provide the first prompt, such as "Please discuss the pros and cons of introducing a new wealth tax, taking turns, with <Chatbot-Name> going first." To control the rate of the conversation (which would otherwise likely go faster than the user could read, and produce more output than desired), the user may be prompted to click on a GUI button to proceed to the next response when ready, with the option to insert the user's own comments and direction into the 3-way conversation, to sometimes steer the conversation in the user's preferred direction.

CTs may include Parallel Chatbot Conversation (PCC), Parallel Image-Generation Conversation (PIGC), Multi-Way Chatbot Conversation (MWCC), and Multi-Way Image-Generation Conversation (MWIGC).

- PCC—a conversation where multiple chatbots respond in parallel to each user prompt, without using one another's responses.
- PIGC—a conversation where multiple image-generating LLMSs respond in parallel to each user prompt, without using one another's responses.
- MWCC—a conversation run through the LLMA that enables a human to request that a set of two or more chatbot-type LLMSs respond to each other, conversing with each other on a user-specified topic, or even debating each other with sides in the debate specified by the user(s).
- MWIGC—a conversation involving at least one User and at least two Image-Generation LLMs where the user(s) can request that one image-generating LLMS produce a new image using a prior image or images from other image-generating LLMSs.

Additionally, prior to opening a conversation for a user, the LLMA 105 can optionally offer users an opportunity to specify a topic (e.g., free text or selection interface element), which may be used to select the priority among the available LLMSs 110, and which would be passed to the LLMSs 110 at the opening of the conversation.

The final user selection from the HS may be the CT and optionally a topic, which will open a Conversation Screen (CS) 155 proper for that CT. The CS 155 is an LLMA-application screen that supports and shows the history of a specific conversation of a specific CT, for the duration of that conversation. The CS 155 includes a text window where the user can type prompts to the LLMSs 110, either the mandatory first prompt, or later prompts that continue the ongoing conversation where each participating LLMS maintains the context of earlier prompts and that LLMS's own prior responses. The CS 155 shows which LLMS qualify and agree to take part in the given CT under the user's required terms specified either from the UP 145, from user-selected terms selected specific to the current conversation, or any combination thereof. The LLMA 105 can identify potential LLMSs using information concerning LLMSs 110 accessed within the LLMS Directory 113 and/or querying various LLMS 110 within the LLMS Directory 113. The order of the LLMSs offered can be chosen by the LLMA 105 based on the UP 145 and/or on prior LLMS ratings, both overall and for the specific user in past conversations. In certain instances, the order of the LLMSs offered can be chosen by the LLMA 105 further based on the selected topic for the conversation. The CS 155 may offer the user the chance to adjust this initial LLMS order.

In some instances, zero LLMSs qualify and agree (a zero-LLMSs-qualify case) to take part in the given CT under the user's required terms specified either from the UP 145, from user-selected terms selected specific to the current conversation, or any combination thereof. A zero-LLMSs-qualify case could either be handled after no LLMSs are found, with an invitation to the user to make the CT restrictions less stringent, or by not even offering the user CT conditions in the HS that no LLMS agrees to, for example, not offering a CT that is both free and that "forgets" the conversation after it is closed, if no LLMS agrees to that combination.

Once the user inputs a prompt into the text window of the CS 155, the LLMA 105 routes, using router 120 and controller 122, the prompt to the one or more LLMSs supporting the CT, consistent with the UP 145. For example, if the CT is chatbot and the UP specifies that the user account name be hidden from the chatbot, then a prompt into the text window of the CS 155 would be routed to all LLMSs that support language generation and conversations with anonymous users. In some instances, the prompts to the LLMSs may be sent accompanied by supporting profile information to improve responses, such as the user's preferred response-difficulty/complexity level, when specified in the UP 145. Conversation data (e.g., prompts, profile information, responses, etc.,) passed between the LLMA 105 and the chosen LLMSs can be encrypted in both directions, unless both the LLMS and the user choice (through the profile, negotiated terms, and/or other pre-conversation option selection(s)) indicates that encryption is not required for that conversation.

Responses to prompts are received by the LLMA 105, using router 120 and controller 122, and optionally ranked according to: ML estimation using ML models 170 trained to classify or rank responses based on a user's preferences; based on overall ratings of the LLMSs; ratings applicable to the user's profile; the user's past ratings of prior responses from the various LLMSs; or any combination thereof. Responses to prompts are rendered in the CS 155 (optionally in ranked order) with an indication of which of the LLMSs provided each of the responses. In this manner, the user can view the prompts and responses from each of the LLMSs in a single interface or window, similar to a dialogue or chat log. Users can end conversations (and trigger required actions like erasing the finished conversation) by selecting one or more GUI elements rendered in the CS 155 (e.g., a return-to-home-page or home screen button (potentially for a new conversation), or an end-session button configured to end the current LLMA session). Moreover, at any stage during a conversation, the conversation-originating user can expel one or more LLMSs from the conversation (e.g., selecting a GUI element to remove the LLMS from the CS 155), continuing the conversation with the remaining LLMS(s)).

In some instances, the CS 155 may be rendered to include one or more GUI elements that offer users the optional opportunity to rate each LLMS's response quality during the conversation, both on a per-response basis and across the whole conversation, at the end of the conversation. These ratings may be saved by the LLMA 105 as part of the UA 142 or UP 145 to help rank user preference between LLMSs, and could be sent on the to LLMSs, where mutually agreed, to provide useful feedback to them.

In certain instances, the LLMA 105 has the option to leverage, using one or more rule or model-based techniques, safety protocols implemented by the each of the LLMSs 110 for conversations. For instance, if the same chatbot prompt was sent to three LLMSs having cross-agreements to share safety alerts, the LLMA 105 can hold up providing the LLMS responses to the user until all three have responded and agreed that the prompt was safe (e.g., not a prompt for instructions on how to build a terrorist device), and would withhold all three responses if any of the three LLMSs flagged the prompt as dangerous, returning instead a safe, generic response from the objecting LLM along the lines of "I cannot answer that question."

Where LLMSs have agreed to share safety-alerts in shared conversations of a given type, responses may occasionally be accompanied by any of one or more distinct, predefined safety alerts that are passed to all the LLMS in the safety agreement and participating in the current conversation, so that all LLMS can then respond more cautiously, or not at all, for the remainder of the conversation. For example, one LLMS might detect that a conversation is entering the realm of potentially assisting in planned illegal acts, which other LLMS might not have picked up on, yet, based on their view of the conversation, but as soon as the first LLMS detects the unsafe nature of the conversation, it could alert the other LLMSs taking part, even in the case of a parallel conversation that otherwise hides what each LLMS is doing from the other LLMSs. In this way, the group as a whole would tend to better recognize safety issues than any single LLMS would do on its own, and the cooperating LLMSs could learn and improve from each-other's share safety alerts.

Groups of two or more LLMSs could optionally agree to share their responses to other LLMS members of the group, for research and training purposes, so that they can mutually accelerate their training and research by learning from one another's parts in shared conversations, including in parallel conversations where they would not otherwise see each other's responses. These agreements could share all or some specified fraction of each other's responses, and it would be up to the LLMA 105 to pass on the agreed-upon responses to LLMSs in the groups, even in parallel conversations, either during those conversations, or separately. This would not however apply to conversations that the user has specified should be erased at the end. For example, LLMS provider "A" and LLMS provider "B" might mutually agree, for purposes of mutually advancing the training of their LLMs that the LLMA 105 should reveal A's responses to B while also revealing B's responses to A whenever the user chooses to send prompts to both A and B in the same conversation. This arrangement, if mutually agreed-upon, would apply even to conversations that are not multi-way conversations—in those conversations, A and B must see each other's responses, as those responses serve as prompts for each other.

The system architecture depicted in FIG. 1 for the distributed environment 100 is merely an example and is not intended to be limiting. Variations, alternatives, and modifications are possible in alternative embodiments. For example, in some implementations, LLMA 105 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Exemplary Conversation Types

Figure 2A:
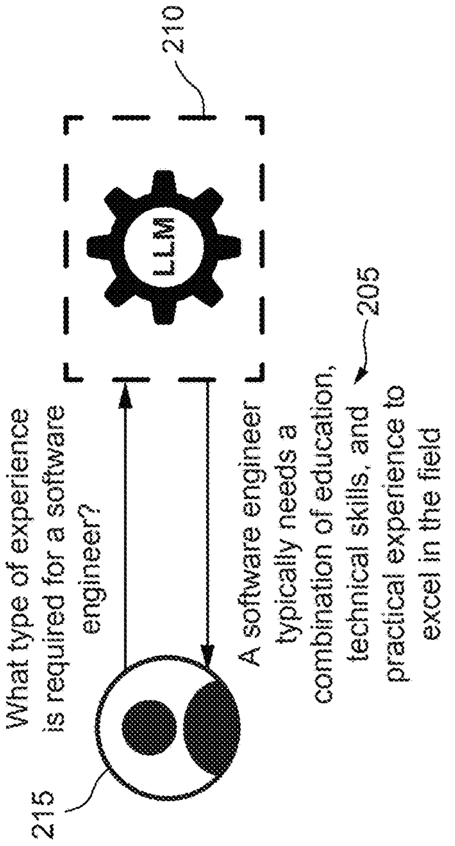
FIGS. 2A-5 are illustrations of various conversation types according to various embodiments.
Figure 2B:
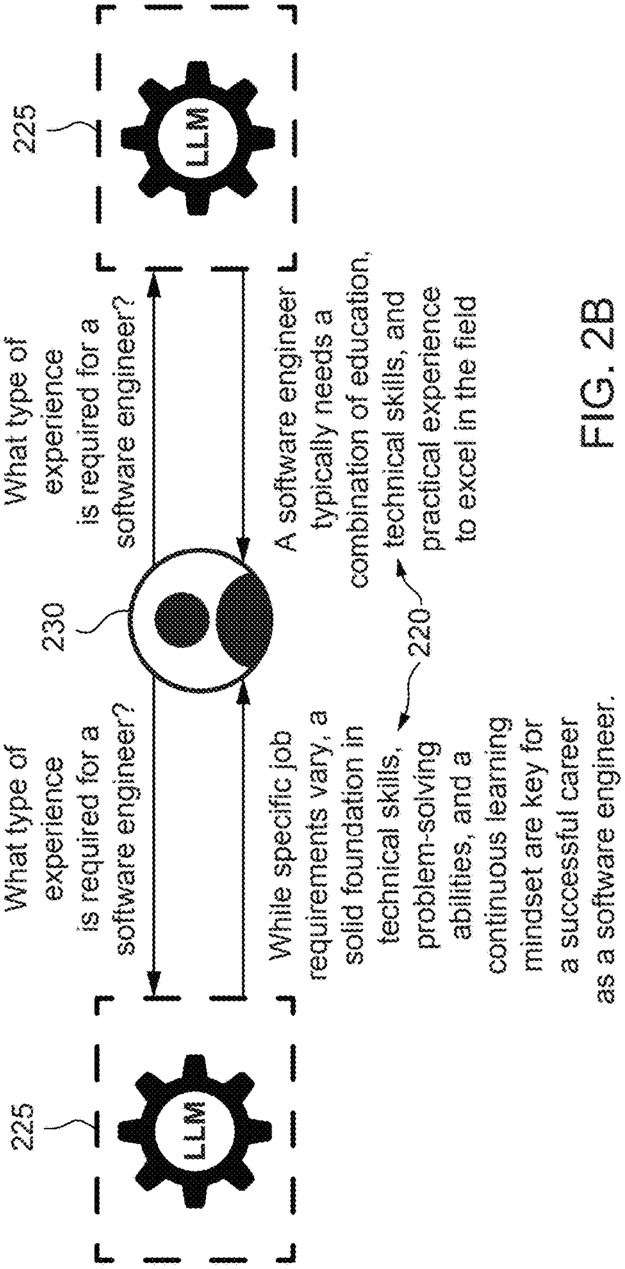

As shown in FIG. 2A, conversations 205 may proceed with only a single LLMS 210, if that is the only one the user 215 wants, or the only one that matches the necessary conversation criteria. In parallel conversations (such as PCCs and PIGCs) with only a single participating LLMS 210, that single LLMS can be instructed to behave as it if is two or more LLMSs, each LLMS responding in parallel only to each of the user's prompts, without taking into account the other LLMSs' responses. In multi-way conversations (such as MWCC and MWIGC) with only a single participating LLMS 210, that single LLMS can be instructed to behave as it if is two or more LLMSs, each responding to each of the user's prompts and the other LLMS responses. However, as shown in FIG. 2B, conversations 220 initiated by the LLMA will typically proceed with two or more LLMSs 225 supporting a given CT, and consistent with the UP for the user 230. In parallel conversations (such as PCCs and PIGCs) with two or more participating LLMSs 225, each LLMS responds in parallel only to each of the user's prompts, without taking into account the other LLMSs' responses. In multi-way conversations (such as MWCC and MWIGC) with two or more participating LLMSs 225, each LLMS responds to each of the user's prompts and to the other LLMS responses.

Figure 3:
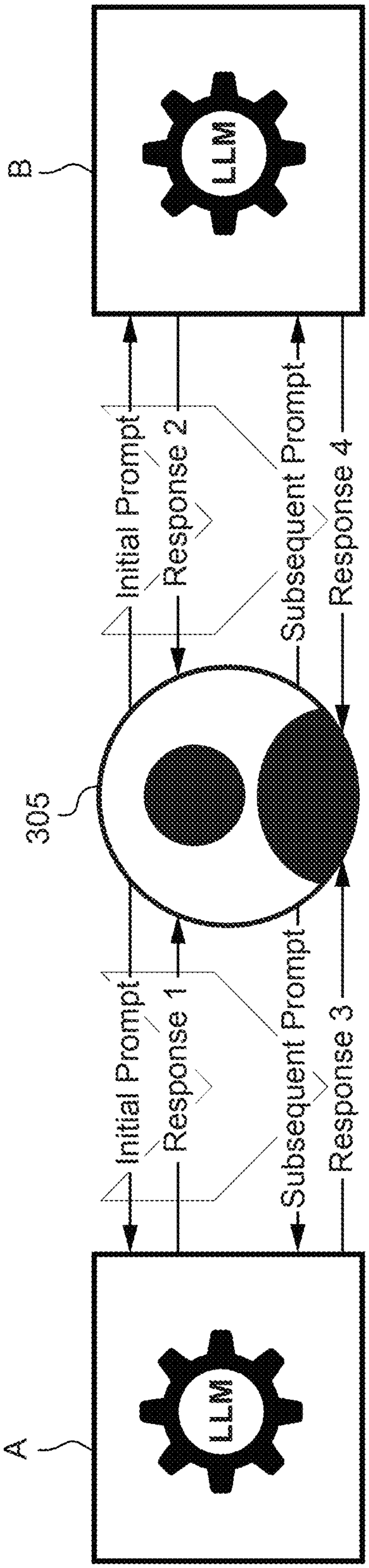

In parallel conversations, the LLMSs respond in parallel, starting with the initial user prompt, but continuing in conversational fashion with responses being generated to each subsequent user prompt. Each response generated by a given LLMS may take into consideration not only the current prompt but also prior prompts from the user and responses generated by the given LLMS but does not take into consideration any of the other LLMS' responses. In a PCC, for example as shown in FIG. 3, a user 305 might specify a starting topic in the Initial Prompt, followed by a Response 1 (from LLMS "A") and a Response 2 (from LLMS "B") to the Initial Prompt, followed by a Subsequent Prompt, followed by a Response 3 (from LLMS "A") and a Response 4 (from LLMS "B") to the Subsequent Prompt, etc. It should be understood that although the LLMSs are responding in parallel that does not necessarily mean they respond at exactly a same time, for example, in some instances, one or mor responses from LLMSs participating in the conversation may be delayed from the others, and in such instances the LLMA may either hold providing the response to the user until all have been received such that all responses are provided to the user at a same time (e.g., in the instance there is agreement to review security protocol across LLMSs) or the LLMA may provide the responses to the user as they are received from the LLMAs or in a particular order such as based on the ranking of the LLMS in the CS.

Figure 4:
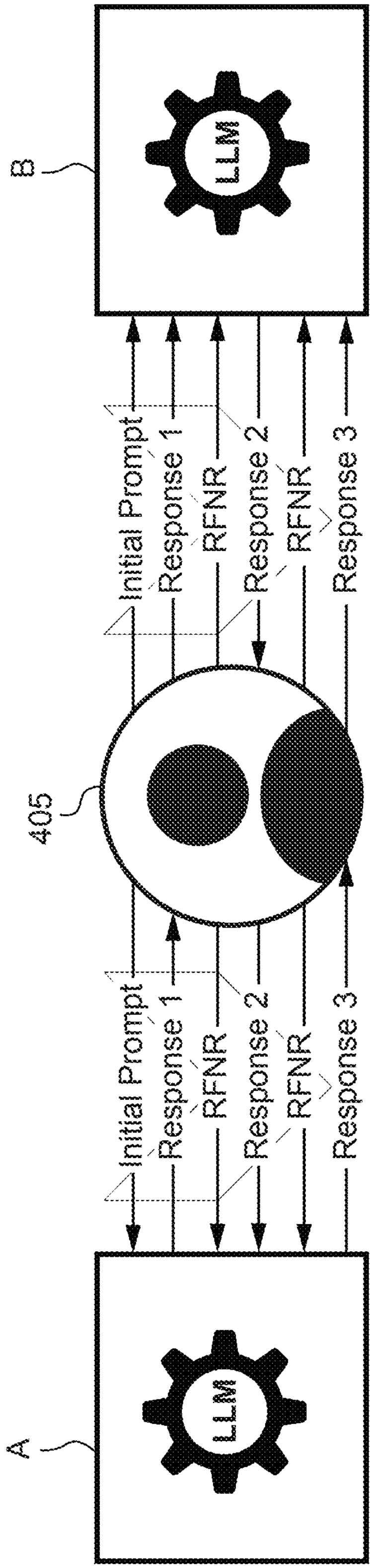

In multi-way conversations, the LLMSs respond serially in turn to prior conversation content, starting with the initial user prompt, but continuing in conversational fashion with responses to both prior user input and to prior LLMS responses, including prior responses from a different LLMS (s), with each response provided when the user indicates they are finished looking at the prior response. In an MWCC, for example as shown in FIG. 4, a user 405 might specify a starting topic in the Initial Prompt, followed by a Response 1 (from LLMS "A"), followed by the user 405 indicating "Ready For Next Response" (RFNR), followed by a Response 2 (from LLMS "B") to Response 1, followed by RFNR, followed by Response 3 (from LLMS "A") to Response 2, etc., with opportunities for the user to insert their own conversation-steering comments before indicating RFNR. The RFNR is a signal sent by the user (e.g., selecting a RFNR GUI element), through the LLMA, to the next-in-line LLMS in a multi-way conversation that the user is ready for the next response. In the instance of conversation-steering comments, the LLMS next in line to respond may formulate a response to both the prior LLMS response and the user's comments. In the instance of multi-way conversations, the LLMA may pass required prior responses to the next-responding LLMS, regardless of which LLMS originated the prior responses required. These prior responses could be passed at the earliest opportunity, so that the LLMS could begin processing a response, though the completed response may not be shown to the user until the user indicates RFNR.

In an MWIGC, the user may provide an initial requested-image description, which the first-in-line LLMS may then provide image(s) based on the initial requested-image description, following which the user may select one or more of the image(s), with optional suggestions for how to refine the image(s), and may choose which LLMS to create subsequent image(s) evolving/merging the selected one or more of the image(s), in the user-specified manner where the user specified change suggestions, etc. This process may continue for any number of rounds to iteratively refine the selected one or more of the image(s) using one or more additional LLMSs.

In multi-way conversations (such as MWCC and MWIGC), a user may override the default next-in-line order (e.g., generated by LLMA based on the UP for a given conversation) that the LLMSs will respond with an explicit prompt indicating which LLMS should respond next, along with other optional prompting as to the nature of the requested next response. Following such explicit LLMS-order override, the former order of LLMS response sequence may resume with the LLM next-in-line after the prior-responding LLMS.

Figure 5:
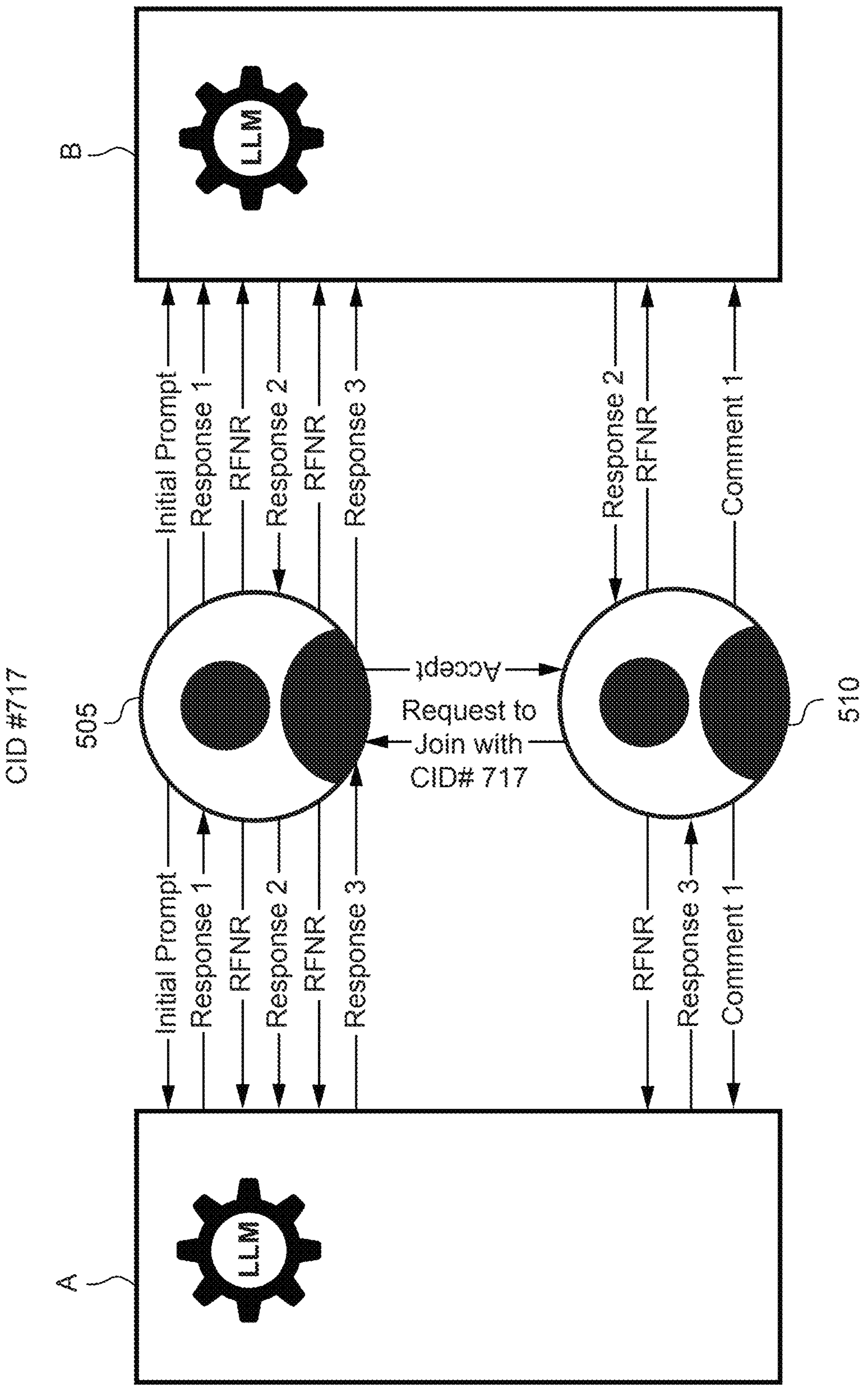

The LLMA can enable Multi-Human Conversations (MHCs) of all the above types, which would behave much like single-human conversations, except that one or more added UAs would be permitted to join a conversation. Fundamentally, an MHC is an LLMA-hosted conversation that at some point in the conversation includes more than one user, and at least one LLMS. To accomplish this as shown in FIG. 5, a new conversation would be first set up in the ordinary way but shown with a specific Conversation ID (CID). For example, a user 505 might specify a starting topic in the Initial Prompt, followed by a Response 1 (from LLMS "A"), followed by the user 505 indicating "Ready For Next Response" (RFNR). Additional users 510 may join the new conversation with a join-existing-conversation option, specifying the CID to join, and the conversation-originating user would receive a query such as "May User <UA account-name> join this Conversation?," and given a positive answer from the originating user, the added user(s) may then be equally able to insert prompts into the conversation and view all conversation prompts (including conversation-steering comments) and responses from their own LLMA screen. Continuing with the same example, a Response 2 (from LLMS "B") to Response 1 may be generated, followed by RFNR from all users, followed by Response 3 (from LLMS "A") to Response 2, etc., with opportunities for all users to insert their own conversation-steering comments (e.g., Comment 1) before indicating RFNR. In the instance of multi-way conversations (where the LLMSs use each-other's responses for their own next response, in turn), the next-in-line LLMS may respond only when all users still on the conversation have indicated RFNR, with an optional time-out if one user waits too long after the last prior RFNR from another user following the most-recent response. Users on an MHC could explicitly drop out prior to the conversation end, with remaining human users still enabled to continue the conversation. The conversation would end when the last human user drops out or explicitly returns to their home page. An MHC may optionally offer a side-window for direct text messaging between the users that is not visible to the LLMSs.

Techniques for Facilitating a Conversation with Multiple LLMSs

Figure 6A:
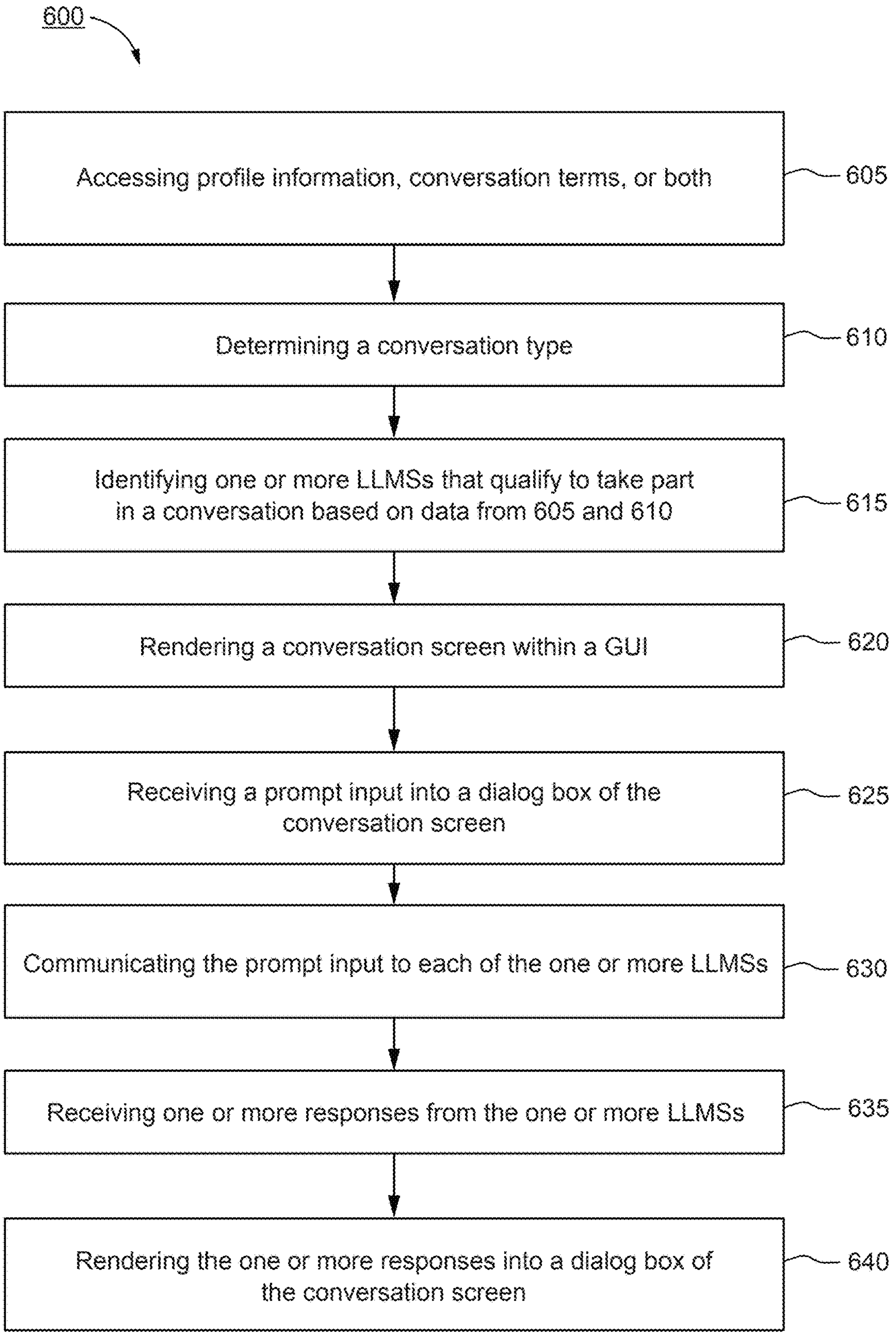
FIGS. 6A and 6B are exemplary flowcharts showing processes for facilitating a conversation with multiple LLMSs according to various embodiments.

FIG. 6A depicts a simplified flowchart depicting techniques for facilitating a conversation with multiple LLMSs according to various embodiments. The process 600 depicted in FIG. 6A may be implemented in software (e.g., code, instructions, program) executed by one or more processing units (e.g., processors, cores) of the respective systems, hardware, or combinations thereof. The software may be stored on a non-transitory storage medium (e.g., on a memory device). In certain embodiments, the process 600 is implemented in software (e.g., code, instructions, program) executed by a computing system (e.g., the LLMA described with respect to FIGS. 1-5). The various processing steps presented in FIG. 6A and described below are intended to be illustrative and non-limiting. Although FIG. 6A depicts the various processing steps occurring in a particular sequence or order, this is not intended to be limiting. In certain alternative embodiments, the steps may be performed in some different order or some steps may also be performed in parallel.

Process 600 begins at step 605, where profile information provided by a user, terms selected by the user that are particular for a conversation, or both are accessed.

At step 610, a conversation type is determined for the conversation. In some instances, a menu is rendered in the graphical user interface. The menu comprises conversation types for selection by the user for the conversation and the conversation type for the conversation is received from the user interacting with the conversation types in the menu. The conversation types may include image-generation and text-based conversation.

At step 615, one or more large language model services that qualify to take part in the conversation are identified based, at least in part, on the conversation type and the profile information provided by the user, the user-selected terms selected by the user specific to the conversation, or both. The one or more large language model services are identified from an original set of large language model services (e.g., LLMSs that have agreed to avail their services to users of an LLMA, LLMSs identified by the LLMA as having potential services for users of the LLMA, LLMSs identified by the LLMA as being used by a given user in the past, and the like). In some instances, identifying the one or more large language models comprises: identifying a subset of large language model services that have one or more generative machine learning models trained to handle the conversation type; and identifying the one or more large language model services from the subset of large language model services that qualify to take part in the conversation and are available to take part in the conversation based, at least in part, on the conversation type and the profile information provided by the user, the user-selected terms selected by the user specific to the conversation, or both. In some instances, the one or more large language models are multiple large language models, e.g., two or more large language models, three or more large language models, etc.

At step 620, a conversation screen is rendered within a graphical user interface. The conversation screen comprises: (i) a representation of the one or more large language model services, and (ii) one or more dialog boxes.

At step 625, a prompt input is received into a dialog box of the one or more dialog boxes.

At step 630, the prompt input is communicated to each of the one or more large language model services. In some instances, communicating the prompt input comprises communicating at least some of the profile information with the prompt input to the one or more large language model services, and the responses from the one or more large language model services are received based on the prompt input and at least some of the profile information.

At step 635, one or more responses are received from the one or more large language model services based on the prompt input. In some instances, the one or more responses from the one or more large language model services are ranked based on: (i) an estimation of probable preferences for the user, (ii) overall ratings of the one or more large language model services, (iii) ratings applicable to the profile information provided by the user, (iv) past ratings by the user of prior responses from the one or more large language model services, or (v) any combination thereof, where the responses are rendered in the one or more dialog boxes based on the ranking. In certain instances, the ranking is only performed when the prompt input results in multiple responses (e.g., two or more responses from a single LLMS or multiple LLMSs) and is not performed when a prompt results in only a single response from a LLMS.

At step 640, the one or more responses are rendered in a dialog box of the one or more dialog boxes with an indication of which of the one or more large language model services provided each of the one or more responses.

In some instances, a subsequent prompt input is received into the one or more dialog boxes by the user; the subsequent prompt input and the one or more responses to the prompt input are communicated to the one or more large language model services; one or more subsequent responses are received from the one or more large language model services based on the one or more subsequent prompt inputs and the one or more responses to the prompt input; and the one or more subsequent responses are rendered in the one or more dialog boxes with an indication of which of the one or more large language model services provided each of the one or more subsequent responses.

In some instances, the one or more responses from each of one or more large language model services of at least a subset of the one or more large language model services are communicated to other large language model services within the subset of the large language model services. The subset of large language model services have an agreement to share responses between member large language model services of the subset of the large language model services.

Figure 6B:
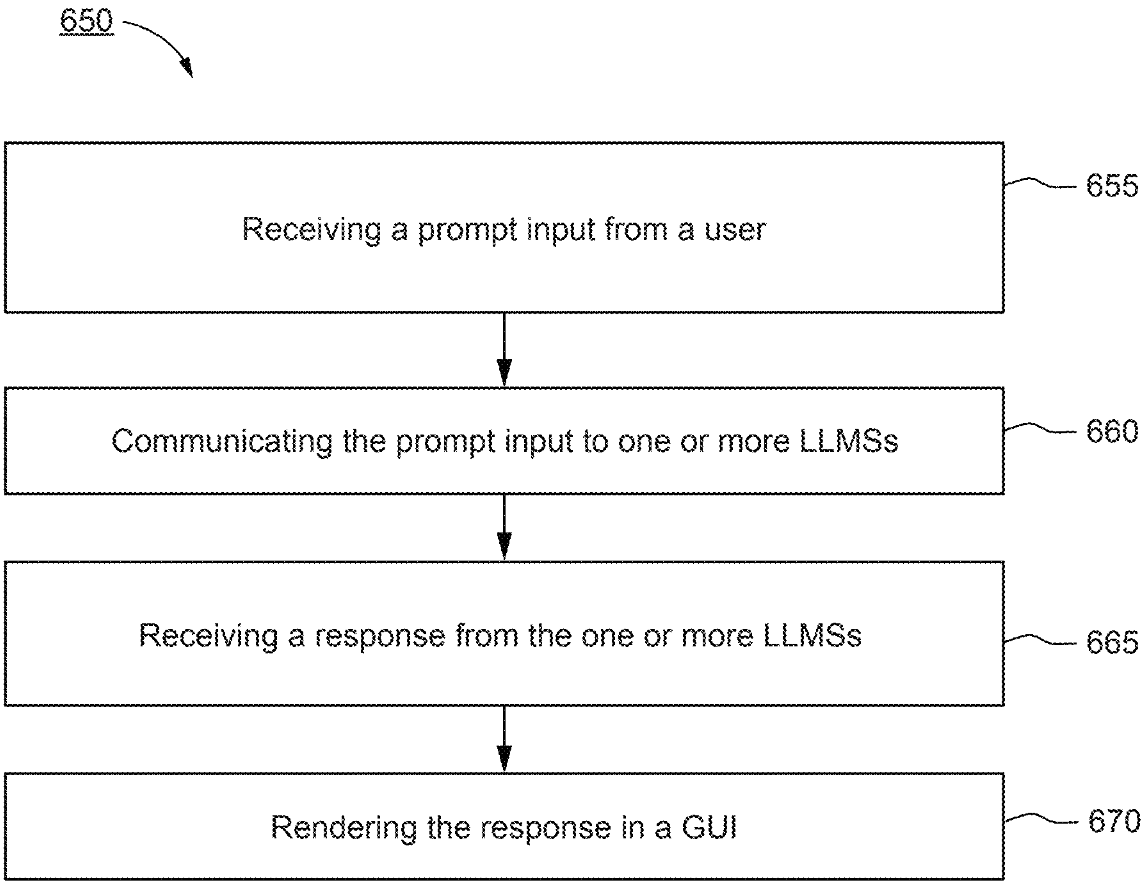

FIG. 6B depicts a simplified flowchart depicting techniques for facilitating a conversation with multiple LLMSs according to various embodiments. The process 650 depicted in FIG. 6B may be implemented in software (e.g., code, instructions, program) executed by one or more processing units (e.g., processors, cores) of the respective systems, hardware, or combinations thereof. The software may be stored on a non-transitory storage medium (e.g., on a memory device). In certain embodiments, the process 650 is implemented in software (e.g., code, instructions, program) executed by a computing system (e.g., the LLMA described with respect to FIGS. 1-5). The various processing steps presented in FIG. 6B and described below are intended to be illustrative and non-limiting. Although FIG. 6B depicts the various processing steps occurring in a particular sequence or order, this is not intended to be limiting. In certain alternative embodiments, the steps may be performed in some different order or some steps may also be performed in parallel.

Process 650 begins at step 655, where a prompt input is received from a user for a conversation with large language model services.

At step 660, the prompt input is communicated to one or more of the large language model services based on a conversation type for the conversation. The one or more large language model services comprises a generative machine learning model that is trained to handle the conversation type. In some instances, prior to or after receipt of the prompt input, large language model services to be made available to the user for the conversation are determined. The determining of the large language model services comprises identifying a subset of large language model services that have one or more generative machine learning models trained to handle the conversation type; and identifying the large language model services from the subset of large language model services that agree to take part in the conversation based on profile information provided by the user. In some instances, the one or more large language models are multiple large language models, e.g., two or more large language models, three or more large language models, etc. The subset of large language model services are identified from an original set of large language model services (e.g., LLMSs that have agreed to avail their services to users of an LLMA, LLMSs identified by the LLMA as having potential services for users of the LLMA, LLMSs identified by the LLMA as being used by a given user in the past, and the like).

At step 665, a response is received from the one or more large language model services based on the prompt input.

At step 670, the response is rendered in a graphical user interface with an indication of which of the one or more large language model services provided the response.

In some instances, a subsequent prompt input is received from the user and a selection of at least one other of the large language model services that is different from the at least one of the large language model services that provided the response; the subsequent prompt input and the response to the prompt input are communicated to the at least one other of the large language model services; a subsequent response is received from the at least one other of the large language model services based on the subsequent prompt input and the response to the prompt input; and the subsequent responses are rendered in the graphical user interface with an indication of which of the large language model services provided the subsequent response.

In some instances, a subsequent prompt input is received from the user; the subsequent prompt input and the response to the prompt input are communicated to at least one other of the large language model services based on an order of the large language model services; a subsequent response is received from the at least one other of the large language model services based on the subsequent prompt input and the response to the prompt input; and the subsequent responses are rendered in the graphical user interface with an indication of which of the large language model services provided the subsequent response. In certain instances, the order of the large language model services is determined based on preferences within the profile information, ratings for the large language model services, or a combination thereof.

In some instances, the prompt input is communicated to each of the large language model services, a response is received from each of the large language model services based on the prompt input, and the responses are rendered in the in the graphical user interface with an indication of which of the large language model services provided each of the responses.

In some instances, a subsequent prompt input is received by the user; the subsequent prompt input and the responses are communicated to the prompt input to the large language model services; subsequent responses are received from the large language model services based on the subsequent prompt input and the responses to the prompt input; and the subsequent responses are rendered in the graphical user interface with an indication of which of the large language model services provided each of the subsequent responses.

Illustrative Systems

As noted above, IaaS is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
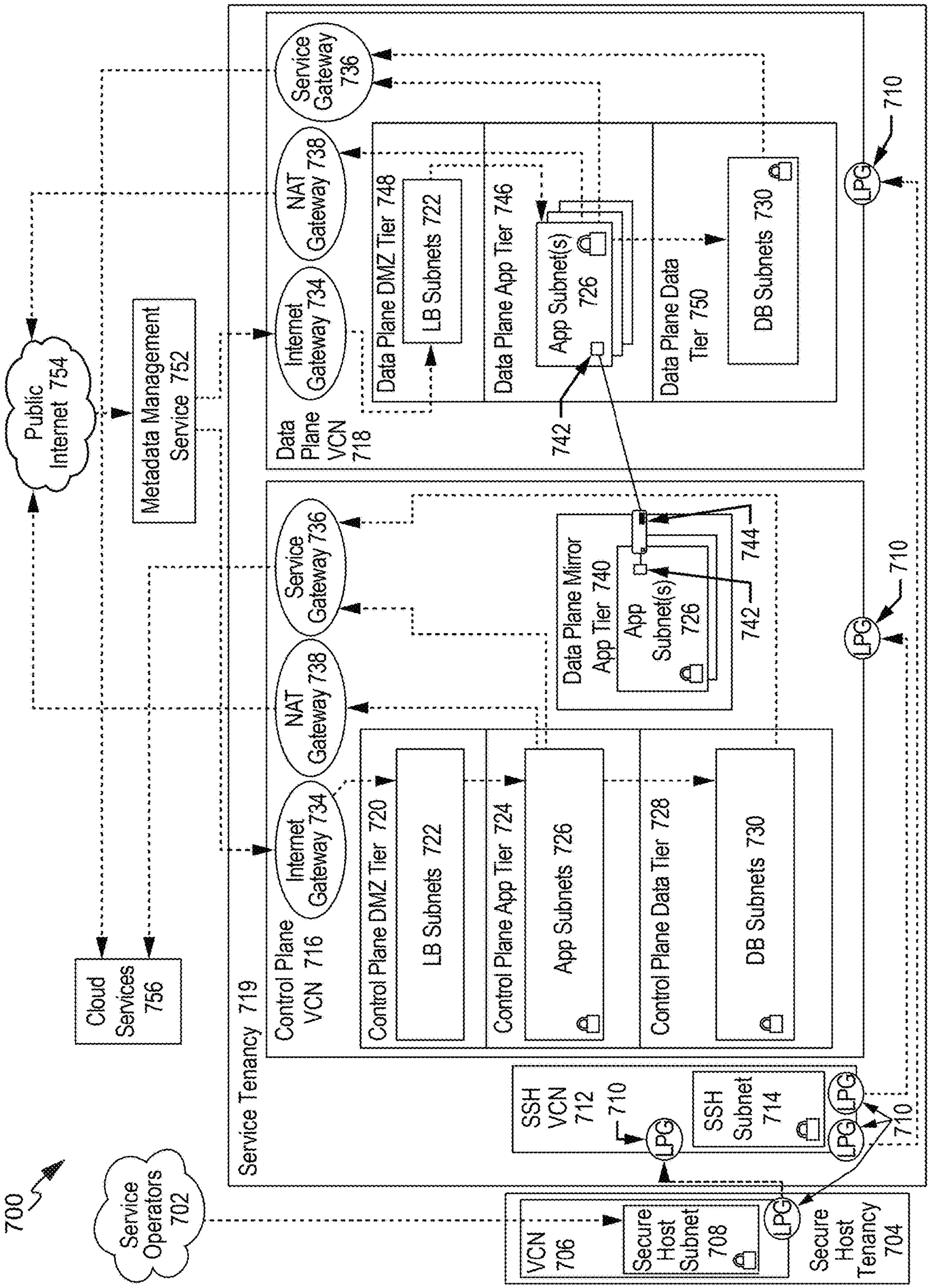
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
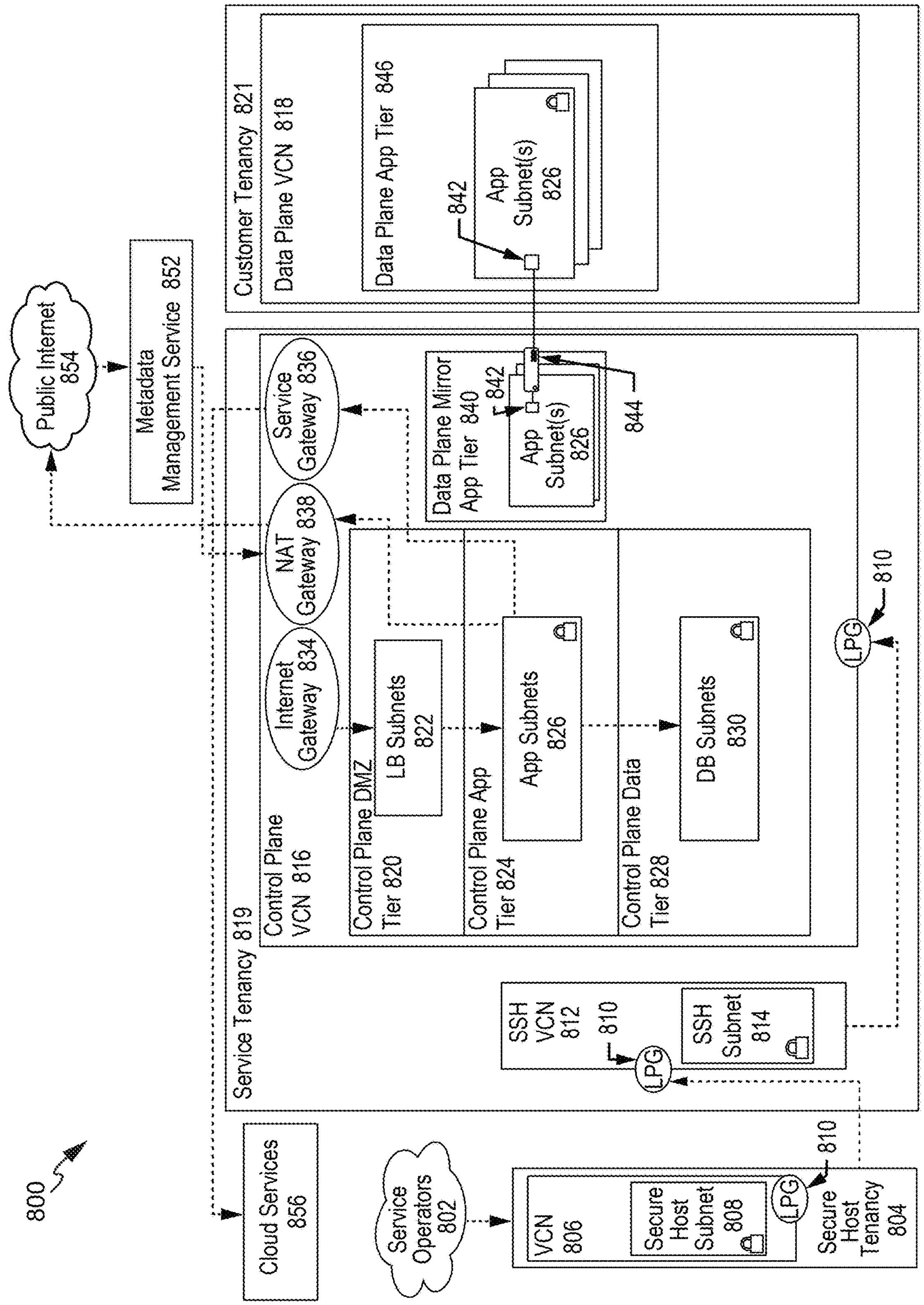
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
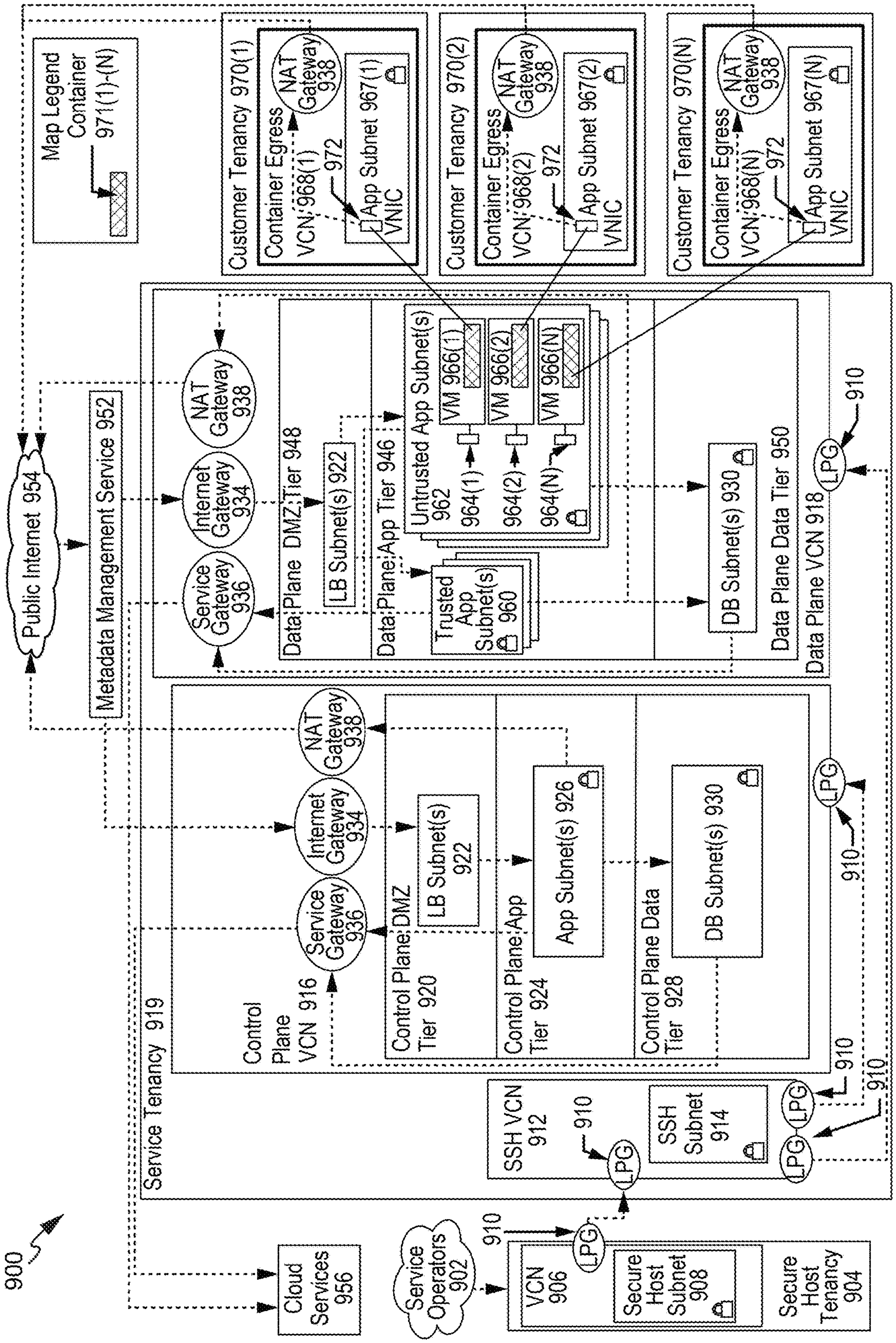
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
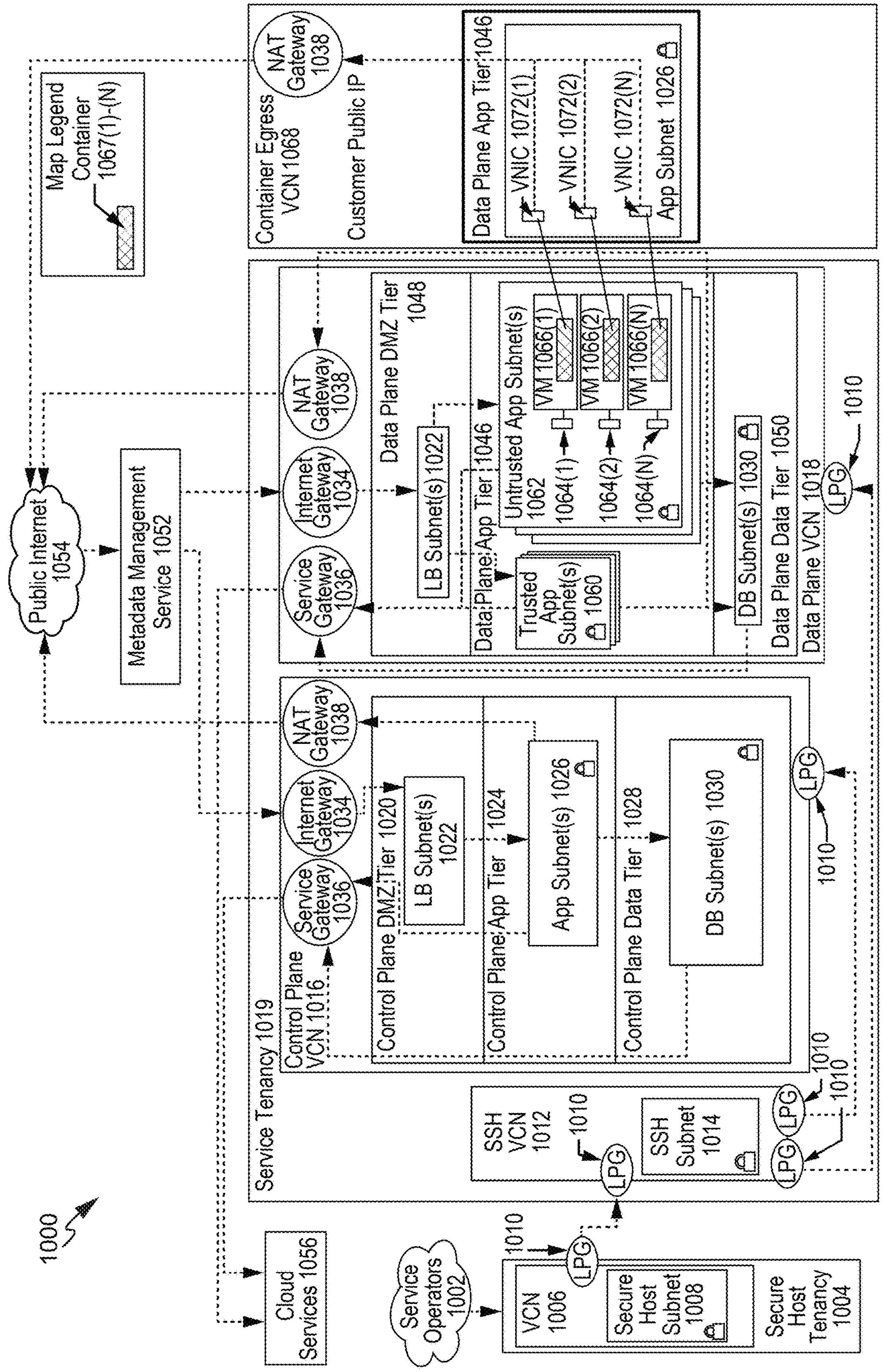
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an laaS system is the OCI provided by the present assignee.

Figure 11:
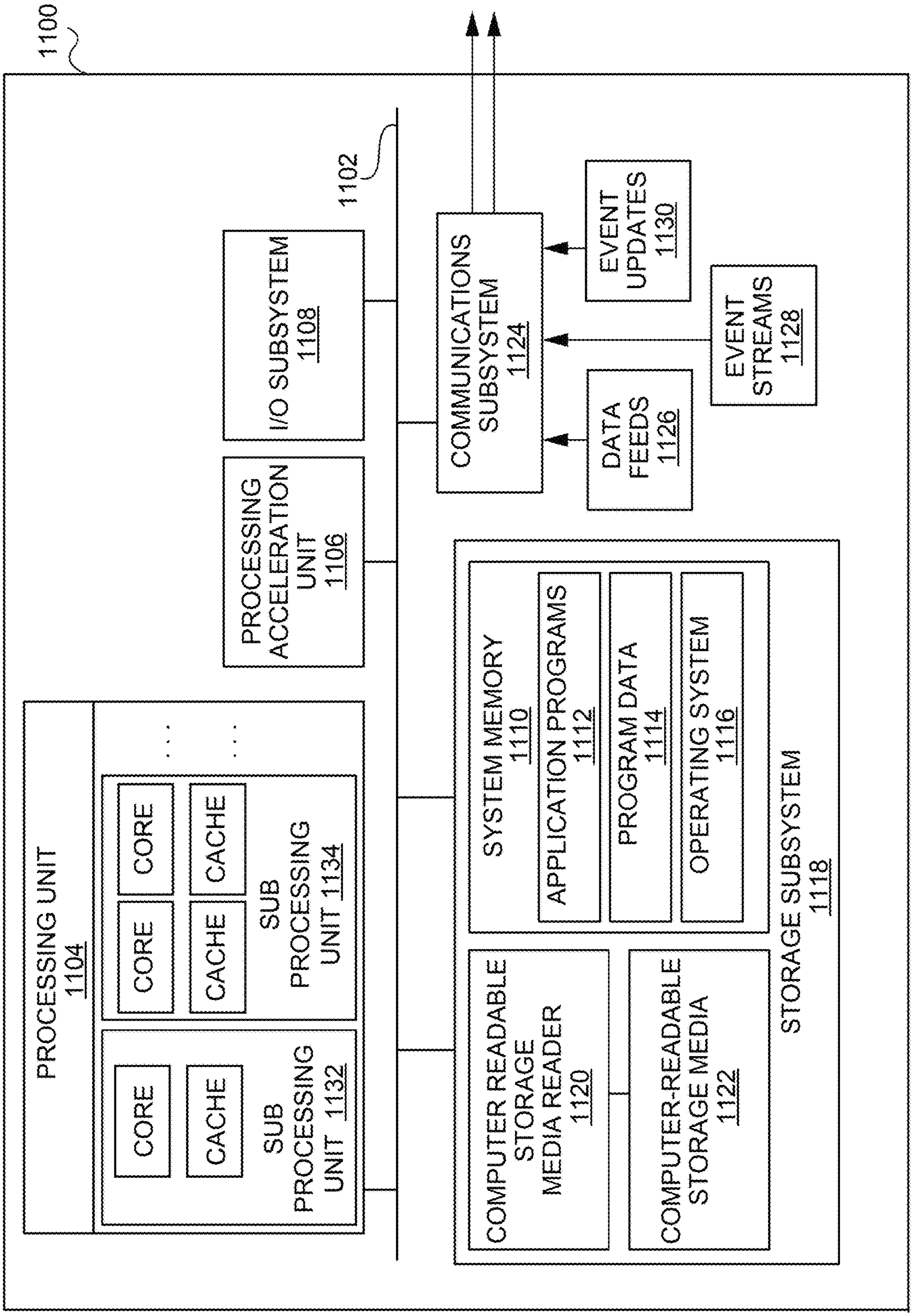
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

accessing, by a computing system, at least one from among profile information provided by a user, and user-selected terms selected by the user that are specific to a conversation;

determining, by the computing system, a conversation type for the conversation;

identifying, by the computing system, one or more large language model services that qualify to take part in the conversation based on the conversation type, and the at least one from among the profile information provided by the user and the user-selected terms;

rendering, by the computing system, a conversation screen within a graphical user interface, wherein the conversation screen comprises: (i) a representation of the one or more large language model services, and (ii) one or more dialog boxes;

receiving, by the computing system, a prompt input into a dialog box of the one or more dialog boxes;

communicating, by the computing system, the prompt input to each of the one or more large language model services;

receiving, by the computing system, one or more responses from the one or more large language model services based on the prompt input; and rendering, by the computing system, the one or more responses in a dialog box of the one or more dialog boxes with an indication of which of the one or more large language model services provided each of the one or more responses, wherein the identifying the one or more large language model services comprises:

identifying a subset of large language model services having one or more generative machine learning models trained to handle the conversation type; and identifying the one or more large language model services from the subset of large language model services that qualify to take part in the conversation and are available to take part in the conversation based on the conversation type and the at least one from among the profile information provided by the user and the user-selected terms, wherein the one or more large language model services include the one or more generative machine learning models.

2. The computer-implemented method of claim 1, wherein communicating the prompt input comprises communicating at least some of the profile information with the prompt input to the one or more large language model services, and wherein the responses from the one or more large language model services are received based on the prompt input and at least some of the profile information.

3. The computer-implemented method of claim 1, further comprising rendering, by the computing system, a menu in the graphical user interface, wherein the menu comprises conversation types for selection by the user for the conversation, wherein the conversation types include image-generation and text-based conversation, and the conversation type for the conversation is received from the user interacting with the conversation types in the menu.

4. The computer-implemented method of claim 1, further comprising ranking, by the computing system, the one or more responses from the one or more large language model services based on: (i) an estimation of probable preferences for the user, (ii) overall ratings of the one or more large language model services, (iii) ratings applicable to the profile information provided by the user, (iv) past ratings by the user of prior responses from the one or more large language model services, or (v) any combination thereof, wherein the responses are rendered in the one or more dialog boxes based on the ranking.

5. The computer-implemented method of claim 1, further comprising:

receiving, by the computing system, a subsequent prompt input into the one or more dialog boxes by the user;

communicating, by the computing system, the subsequent prompt input and the one or more responses to the prompt input to the one or more large language model services;

receiving, by the computing system, one or more subsequent responses from the one or more large language model services based on one or more subsequent prompt inputs and the one or more responses to the prompt input; and rendering, by the computing system, the one or more subsequent responses in the one or more dialog boxes with an indication of which of the one or more large language model services provided each of the one or more subsequent responses.

6. The computer-implemented method of claim 1, further comprising communicating, by the computing system, one or more responses from each of the one or more large language model services to other large language model services within the subset of large language model services, wherein the large language model services of the subset have an agreement to share responses between member large language model services of the subset of large language model services.

7. A computer-implemented method comprising:

accessing, by a computing system, at least one from among profile information provided by a user and user-selected terms selected by the user that are specific to a conversation;

determining, by the computing system, a conversation type for the conversation;

identifying, by the computing system, one or more large language model services that qualify to take part in the conversation based on the conversation type, and the at least one from among the profile information provided by the user and the user-selected terms;

rendering, by the computing system, a conversation screen within a graphical user interface, wherein the conversation screen comprises: (i) a representation of the one or more large language model services, and (ii) one or more dialog boxes;

receiving, by the computing system, a prompt input into a dialog box of the one or more dialog boxes;

communicating, by the computing system, the prompt input to each of the one or more large language model services;

receiving, by the computing system, one or more responses from the one or more large language model services based on the prompt input; and rendering, by the computing system, the one or more responses in a dialog box of the one or more dialog boxes with an indication of which of the one or more large language model services provided each of the one or more responses, wherein:

the computer-implemented method further comprises rendering, by the computing system, a menu in the graphical user interface, the menu comprises conversation types for selection by the user for the conversation, the conversation types include image-generation and text-based conversation, and the conversation type for the conversation is received from the user interacting with the conversation types in the menu.

8. The computer-implemented method of claim 7, wherein communicating the prompt input comprises communicating at least some of the profile information with the prompt input to the one or more large language model services, and wherein the responses from the one or more large language model services are received based on the prompt input and at least some of the profile information.

9. The computer-implemented method of claim 7, wherein the identifying the one or more large language model services comprises:

identifying a subset of large language model services that have one or more generative machine learning models trained to handle the conversation type; and identifying the one or more large language model services from the subset of large language model services that qualify to take part in the conversation and are available to take part in the conversation based, at least in part, on the conversation type and the profile information provided by the user, the user-selected terms selected by the user specific to the conversation, or both.

10. The computer-implemented method of claim 7, wherein further comprising:

ranking the one or more responses from the one or more large language model services based on: (i) an estimation of probable preferences for the user, (ii) overall ratings of the one or more large language model services, (iii) ratings applicable to the profile information provided by the user, (iv) past ratings by the user of prior responses from the one or more large language model services, or (v) any combination thereof, wherein the responses are rendered in the one or more dialog boxes based on the ranking.

11. The computer-implemented method of claim 7, further comprise:

receiving a subsequent prompt input into the one or more dialog boxes by the user;

communicating the subsequent prompt input and the one or more responses to the prompt input to the one or more large language model services;

receiving one or more subsequent responses from the one or more large language model services based on one or more subsequent prompt inputs and the one or more responses to the prompt input; and rendering the one or more subsequent responses in the one or more dialog boxes with an indication of which of the one or more large language model services provided each of the one or more subsequent responses.

12. The computer-implemented method of claim 7, wherein further comprising:

communicating one or more responses from each of the one or more large language model services of a subset of large language model services to other large language model services within the subset of large language model services, wherein the large language model services of the subset have an agreement to share responses between member large language model services of the subset of large language model services.

13. A computer-implemented method comprising:

accessing, by a computing system, at least one from among profile information provided by a user, and user-selected terms selected by the user that are specific to a conversation;

determining, by the computing system, a conversation type for the conversation;

identifying, by the computing system, one or more large language model services that qualify to take part in the conversation based on the conversation type, and the at least one from among the profile information provided by the user and the user-selected terms;

rendering, by the computing system, a conversation screen within a graphical user interface, wherein the conversation screen comprises: (i) a representation of the one or more large language model services, and (ii) one or more dialog boxes;

receiving, by the computing system, a prompt input into a dialog box of the one or more dialog boxes;

communicating, by the computing system, the prompt input to each of the one or more large language model services;

receiving, by the computing system, one or more responses from the one or more large language model services based on the prompt input; and rendering, by the computing system, the one or more responses in a dialog box of the one or more dialog boxes with an indication of which of the one or more large language model services provided each of the one or more responses, wherein the computer-implemented method further comprises:

communicating, by the computing system, the one or more responses from each of the one or more large language model services of a subset of large language model services to other large language model services within the subset of large language model services, and wherein the large language model services of the subset have an agreement to share responses between member large language model services of the subset of large language model services.

14. The computer-implemented method of claim 13, further comprising:

rendering a menu in the graphical user interface, wherein the menu comprises conversation types for selection by the user for the conversation, wherein the conversation types include image-generation and text-based conversation, and the conversation type for the conversation is received from the user interacting with the conversation types in the menu.

15. The computer-implemented method of claim 13, wherein the identifying the one or more large language model services comprises:

identifying the subset of large language model services that have one or more generative machine learning models trained to handle the conversation type; and identifying the one or more large language model services from the subset of large language model services that qualify to take part in the conversation and are available to take part in the conversation based, at least in part, on the conversation type and the profile information provided by the user, the user-selected terms selected by the user specific to the conversation, or both.

16. The computer-implemented method of claim 13, further comprising:

ranking the one or more responses from the one or more large language model services based on: (i) an estimation of probable preferences for the user, (ii) overall ratings of the one or more large language model services, (iii) ratings applicable to the profile information provided by the user, (iv) past ratings by the user of prior responses from the one or more large language model services, or (v) any combination thereof, wherein the responses are rendered in the one or more dialog boxes based on the ranking.

17. The computer-implemented method of claim 13, further comprising:

receiving a subsequent prompt input into the one or more dialog boxes by the user;

communicating the subsequent prompt input and the one or more responses to the prompt input to the one or more large language model services;

receiving one or more subsequent responses from the one or more large language model services based on one or more subsequent prompt inputs and the one or more responses to the prompt input; and rendering the one or more subsequent responses in the one or more dialog boxes with an indication of which of the one or more large language model services provided each of the one or more subsequent responses.

18. One or more non-transitory computer-readable media storing instructions which, when executed by one or more processors of the computing system of claim 1, cause the computing system to execute the computer-implemented method of claim 1.

19. One or more non-transitory computer-readable media storing instructions which, when executed by one or more processors of the computing system of claim 7, cause the computing system to execute the computer-implemented method of claim 7.

20. One or more non-transitory computer-readable media storing instructions which, when executed by one or more processors of the computing system of claim 13, cause the computing system to execute the computer-implemented method of claim 13.

* * * * *